US012576598B2

(12) United States Patent
Fuchs

(10) Patent No.: US 12,576,598 B2
(45) Date of Patent: Mar. 17, 2026

(54) PREHEATING ARRANGEMENT FOR A WELDING DEVICE, A RESPECTIVE WELDING DEVICE AS WELL AS A PREHEATING METHOD AND A WELDING METHOD

(71) Applicant: BRANSON Ultraschall Niederlassung der Emerson Technologies Gmbh & Co. OHG, Dietzenbach (DE)

(72) Inventor: Silvio Fuchs, Hasselroth (DE)

(73) Assignee: BRANSON Ultraschall Niederlassung der Emerson Technologies Gmbh & Co. OHG, Dietzenbach (DE)

( * ) Notice: Subject to any disclaimer, the term of this patent is extended or adjusted under 35 U.S.C. 154(b) by 429 days.

(21) Appl. No.: 17/961,610

(22) Filed: Oct. 7, 2022

(65) Prior Publication Data

US 2023/0114272 A1     Apr. 13, 2023

(30) Foreign Application Priority Data

Oct. 8, 2021    (EP) ..................................... 21201749

(51) Int. Cl.
*B29C 65/00*       (2006.01)
*B29C 65/14*       (2006.01)
*B29C 65/10*       (2006.01)

(52) U.S. Cl.
CPC ...... *B29C 65/1412* (2013.01); *B29C 65/1464* (2013.01); *B29C 65/103* (2013.01);
(Continued)

(58) Field of Classification Search
CPC .............. B29C 65/103; B29C 65/1412; B29C 65/1432; B29C 65/1464; B29C 66/00141;
(Continued)

(56) References Cited

U.S. PATENT DOCUMENTS 5,035,045 A * 7/1991 Bowen ................ B29C 65/1664
                                                                  29/730
5,151,149 A * 9/1992 Swartz ................ B29C 66/1122
                                                                  156/499
(Continued)

FOREIGN PATENT DOCUMENTS

CN          203541844 U      4/2014
CN          206898639 U      1/2018
(Continued)

OTHER PUBLICATIONS

JP Office Action for JP Application No. 2022-126211 dated May 23, 2023 (5 pages).
(Continued)

*Primary Examiner* — Philip C Tucker
*Assistant Examiner* — Nickolas R Harm
(74) *Attorney, Agent, or Firm* — Reising Ethington P.C.

(57)     ABSTRACT

A preheating arrangement includes a preheating device defining a first plane by a first centerline along a first axis and a second centerline along a second axis perpendicular to the first axis. A first preheating structure is asymmetric with respect to the first and/or the second centerline. A second preheating structure is oriented like the first preheating structure such that, when viewed along a third axis perpendicular to the first plane, the preheating structures are arranged one above the other. A first actuator rotates the preheating device between first and second positions and the preheating structures in the first position have a first orientation and in the second position a second orientation rotated around the axis of asymmetry by 180° or in which they are rotated by an angle $\alpha$ in the range of $0°<\alpha<360°$, or $90°\le\alpha\le270°$ or $\alpha=180°$ around the third axis compared to the first orientation.

8 Claims, 6 Drawing Sheets

(52) U.S. Cl.
CPC .... *B29C 65/1432* (2013.01); *B29C 66/00141* (2013.01); *B29C 66/1122* (2013.01); *B29C 66/349* (2013.01); *B29C 66/8145* (2013.01)

(58) Field of Classification Search
CPC . B29C 66/1122; B29C 66/349; B29C 66/359; B29C 66/8145
See application file for complete search history.

(56) References Cited

U.S. PATENT DOCUMENTS

| | | | |
|---|---|---|---|
| 8,256,480 | B1 | 9/2012 | Weber et al. |
| 9,033,205 | B2 | 5/2015 | Castillo et al. |
| 10,220,572 | B2 | 3/2019 | Knecht et al. |
| 11,214,016 | B2 | 1/2022 | Barkhoff |
| 2010/0147459 | A1* | 6/2010 | Nathrop ................ B29C 66/003 156/304.6 |
| 2015/0118453 | A1* | 4/2015 | Gotzelmann ........... B32B 27/32 428/198 |
| 2016/0221070 | A1 | 8/2016 | Gaudin |
| 2019/0084245 | A1* | 3/2019 | Cathcart ............. B29C 66/8145 |
| 2020/0055259 | A1 | 2/2020 | Tiryaki et al. |
| 2021/0016517 | A1* | 1/2021 | Barkhoff ............. B29C 65/7802 |

FOREIGN PATENT DOCUMENTS

| | | |
|---|---|---|
| CN | 109834383 A | 6/2019 |
| CN | 110834137 A | 2/2020 |
| CN | 111344140 A | 6/2020 |
| CN | 213916744 U | 8/2021 |
| DE | 102017010550 A1 | 5/2019 |
| EP | 1415789 A1 | 5/2004 |
| EP | 3009254 A2 | 4/2016 |
| EP | 3012081 A1 | 4/2016 |
| JP | 2001297608 A | 10/2001 |

OTHER PUBLICATIONS

CN Office Action for CN Application No. 202211074079.3 dated Apr. 30, 2024 (9 pages).

* cited by examiner

PREHEATING ARRANGEMENT FOR A WELDING DEVICE, A RESPECTIVE WELDING DEVICE AS WELL AS A PREHEATING METHOD AND A WELDING METHOD

CROSS REFERENCE TO RELATED APPLICATIONS

This application claims the priority to EP Patent Application No. EP21201749.5 filed on Oct. 8, 2021, and the entire content of this priority application is incorporated herein by reference in its entirety.

TECHNICAL FIELD

The present disclosure is related to a preheating arrangement for a welding device, a respective welding device, a preheating method using the preheating arrangement, a welding method using the welding device as well as a retrofitting method.

BACKGROUND

Preheating arrangements are generally known, in combination with welding devices for welding two components, such as plastic components, to each other.

Usually, the welding devices comprise a frame or a housing with a lower tool arranged therein as well as an upper tool arranged therein. The lower tool is fastened to a lifting table, whereas the upper tool is rigidly mounted to an upper tool plate. By means of the lifting table, the lower tool can be moved in the direction of the upper tool to weld a first component in the lower tool to a second component in the upper tool by means of friction or vibration welding.

Such welding devices are used for example in the automotive industry or in the medical technology. In the automotive industry, the welding devices are used for producing lights but may be used also in the production of other components or component groups which consist of plastic or contain plastic. In a similar way, the welding device may be used in the production of devices and/or component groups in the medical technology or in the production of consumer goods.

The basic operation of the welding device including a preheating arrangement is as follows. At first a user places a first component on the lower tool. Subsequently, he positions a second component on the first component in the lower tool. Then, the lifting table with the lower tool and the components arranged thereon moves along the vertical axis from an initial position in the direction of the upper tool until the second component is received in the upper tool.

The lifting table now moves back into a position, in which the preheating arrangement can be arranged from an idle or parking position in an aligning or preheating position between the two components. After the preheating arrangement has been arranged between the two components, the two components are preheated at the points to be welded. For this purpose, the preheating arrangement has a respective preheating structure. Subsequently to the preheating, the preheating arrangement is moved back into the idle or parking position.

Then, the lifting table is moved into a welding position and a welding of the first component to the second component takes place, which may be by means of friction or vibration welding. After finishing the welding, the lifting table moves with the lower tool and the compound of first and second component arranged thereon along the vertical axis from the welding position back into the initial position. As soon as the lifting table has reached the initial position, the user removes the compound of first and second component.

An example of a welding device including a preheating arrangement is described in EP 3 009 254 A2.

A disadvantage of the above-described welding device and, thus, of the preheating arrangement becomes apparent if several components shall be welded to each other which have a complex congruent welding structure which is oriented differently between the two sides of the component.

For example, it is assumed that the components to be welded have a rectangular shape and define a plane by means of a first centerline extending between and parallel to the longitudinal sides and a second centerline extending between and parallel to the transverse sides of the rectangle. Each component comprises on a first side a first welding structure and on an opposite second side a second welding structure. Both welding structures are congruent and asymmetric with respect to the first centerline. Further, it is assumed that the welding structure on the second side is rotated by 180° around an axis being perpendicular to the plane. Thus, and when viewed along this axis, i.e., from above onto and through the component, the first and the second welding structure have different orientations such that they do not completely overlap each other.

In a first cycle, the worker would place one component in the lower tool and another component in the upper tool. Here, he would have to focus on the orientation of the welding structures such that the welding structure of the component in the upper tool which faces the lower tool corresponds to the welding structure of the component in the lower tool facing the upper tool.

After arranging the components correctly in the welding device, the welding method is performed including the preheating by means of the preheating arrangement having the respectively oriented preheating structures. Already here, it should be considered that for a reliable preheating the preheating structure of the preheating arrangement is adapted to the welding structure to be preheated.

Subsequently to the first cycle, the component which was at the beginning of the cycle in the upper tool defines now the new, i.e., differently oriented, welding structure with the side facing the upper tool. Thus, the welding structure of this side, which was in the first cycle received in the upper component, is oriented differently, i.e., 180° rotated around the third axis, as explained above. As a result, the preheating structure of the preheating arrangement does not match the welding structure and, therefore, cannot ensure a reliable preheating of this component. The same applies with respect to the welding structure of a respective component arranged in the upper tool such that both components have matching welding structures.

It is therefore an object of at least some implementations of the present disclosure to provide a preheating arrangement by means of which the above disadvantage can be overcome so that a plurality of components which shall be welded to each other for forming a stack of welded components are preheated with low effort as well as in an easy and reliable manner. Further, it is also an object of at least some implementations of the disclosure to provide a respective welding device, a preheating method as well as a welding method.

SUMMARY

A preheating arrangement, a welding device, a preheating method as well as a welding method and a retrofitting method are disclosed. Further embodiments and developments result from the following description, the drawings as well as the appending claims.

A preheating arrangement for a welding device having an upper tool mounted to an upper support and a lower tool mounted to a lower support, wherein the upper and the lower sup-port are movable relative to each other between an initial position and a welding position, comprises a preheating device defining a first plane by means of a first centerline extending along a first axis and a second centerline extending along a second axis being perpendicular to the first axis and the preheating device has a first side with a first preheating structure and an opposite second side with a second preheating structure, wherein the first preheating structure is asymmetric with respect to the first and/or the second centerline so that the respective axis is an axis of asymmetry, and the second preheating structure corresponds to the first preheating structure and is oriented like the first preheating structure such that, when viewed along a third axis perpendicular to the first plane, the first and the second preheating structure are arranged one above the other, wherein the preheating arrangement comprises further a first actuator for rotating the preheating device between a first position and a second position such that the preheating structures in the first position have a first orientation and in the second position a second orientation in which they are rotated around the axis of asymmetry by 180° compared to the first orientation or in which they are rotated by an angle α in the range of 0°<α<360°, or 90°≤α≤270° or α=180° around the third axis compared to the first orientation.

In the following, the preheating arrangement will be explained based on its use in a welding device. In this regard, the process of preheating may be considered. The exemplary welding device comprises, besides the preheating arrangement, a lower tool mounted to a lower support and an upper tool mounted to an upper support. The lower and the upper support are movable relative to each other between an initial position and a welding position. The preheating arrangement is movable between a parking position and a preheating position such that the preheating arrangement is arranged in the preheating position between the upper and the lower support. Further, the upper and the lower support are each arranged in a plane parallel to the first plane defined by the preheating device when the preheating arrangement is in the preheating position. The term third axis refers, thus, to an axis being perpendicular to the respective plane.

By means of this welding device, a plurality of components is welded to each other, according to the now described example. Each of these components comprises on a first side a first welding structure and on an opposite second side a second welding structure. The first and the second welding structure are formed congruent with the first and the second preheating structure of the preheating device. Congruent means in this regard that it has the same shape and size. Thus, the first and the second preheating structure as well as the first and the second welding structure are identical in terms of shape and size.

Further, the first and the second welding structures are oriented such that the first welding structure and the second welding structure are rotated with respect to each other around the axis of asymmetry by 180° or around the third axis by the angle α. In other words, and according to a further embodiment, the welding structures are rotation symmetric with respect to each other. Specifically, a rotation of one of the welding structures around at least one of the first and the second centerline by 180° results in the other or opposite welding structure.

For an easier understanding of this feature, a component having a rectangular shape is assumed. A first centerline of the component extends parallel to and between the transverse sides of the component. A second centerline extends parallel to and between the longitudinal sides of the component. The first and the second centerline define, as a result, a plane and separate the component into four geometrically equal parts. The point of intersection of the centerlines indicates the geometric center of the component. In the further course of this example, it is assumed that the component is watched in horizontal or landscape format meaning that the longitudinal sides extend from left to right.

On the first side of the component, a first welding structure is arranged. This welding structure is, for example, formed like a rectangle with rounded corners, wherein the first welding structure has a protrusion in each of two adjacent corners. Referring to the four geometrically equal parts into which the component is divided by the centerlines, it is assumed that the two protrusions of the welding structure are present in the upper left and the upper right part of the first side of the component when viewing the first side from above, i.e., along the third axis extending perpendicular to the plane. As a result, the second centerline extending between and parallel to the longitudinal sides is an axis of asymmetry whereas the first centerline extending between and parallel to the transverse sides is an axis of symmetry. Although this is an exemplary implementation, the remaining of the first or the second centerline may be an axis of symmetry, in case of a component having a rectangular shape.

On the second side of the component, a second welding structure is arranged. This welding structure is congruent with the first welding structure. Thus, and as explained above, it has the same size and shape. However, the second welding structure is arranged in a different orientation on the second side compared to the first welding structure on the first side.

This different orientation is achieved in that the second welding structure is arranged on the second side in a rotated manner compared to the first welding structure. As a result, the first and the second welding structures are arranged such that they are not arranged completely one above the other when viewed from above the first or the second side and through the component.

The term one above the other indicates that a shadow of one structure which is caused by an imaginary light shining from one side through the component covers the other structure completely. Thus, and as the welding structures are not arranged one above the other, i.e., completely one above the other, the second welding structure must have a different orientation compared to the first welding structure.

Such different orientation can be achieved either by rotating the second welding structure compared to the first welding structure around the axis of asymmetry by 180° or by rotating the second welding structure compared to the first welding structure about the third axis, which is perpendicular to the plane, by a certain degree α.

A rotating of the second welding structure on the second side compared to the first welding structure around the axis of asymmetry by 180° would, with respect to the above example, lead to the fact that the two protrusions are arranged at the lower left and the lower right part. This applies when the component is viewed from the first side and through the component.

Due to this, and in case the component is turned from a position in which the first side can be seen around the axis of asymmetry, i.e., around the longitudinal centerline, to a position in which the second side can be seen, the second welding structure will expose the same orientation to the observer as the first welding structure. On the other hand, and in case the component is turned from the first side to the second side around the axis of symmetry, i.e., around the transverse centerline, the second welding structure will expose a different orientation compared to the first welding structure. The two protrusions may be present on the second side in the lower part of the component whereas they are present on the first side in the upper part.

Alternatively, the second welding structure could be rotated compared to the first welding structure about the third axis, which is perpendicular to the plane, by a certain degree α. With respect to the above first example of rotating, and in case the second welding structure is rotated by 180° around the third axis, the result would be the same compared to the rotating about the axis of asymmetry. Thus, a rotation by 180° is, regardless of other possible rotation angles, may be preferred. Nevertheless, and in case the welding structures may be asymmetrical with respect to both centerlines, a rotation by other angle values unequal to 0° and 360° may be useful.

That said with respect to the general design of the components to be welded to each other, the welding method, and thus, the preheating method will be explained with respect to several exemplary welding cycles.

Initially, the first component is arranged in the upper tool and a second component, being identical to the first component or having a matching or identical welding structure, is arranged in the lower tool. As an alternative, a stack of welded components is already present in the lower tool. In this case, the side of the stack of welded components facing the first component has a third welding structure. In each case, the first component and the second component or the first component and the stack of welded components are arranged such that their welding structures match each other.

For an easier understanding, and with respect to the above exemplary component and its welding structure, it is assumed that the first component is arranged such that the first side having the first welding structure faces the lower tool and the second side having the second welding structure is arranged in the upper tool. Consequently, the second component, which is for example identical to the first component, is arranged in the lower tool such that the first side having the first welding structure faces the upper tool, i.e., the first side of the first component in the upper tool. For sake of clarity, the welding structure exposed by the second component or stack of welded components is referred to as third welding structure. This will become clear in the subsequent second cycle.

As initially discussed, the first component is held in the upper tool by means of an underpressure. Furthermore, and for the exemplary operation, the upper support of the welding device is an upper mounting plate, and the lower support is a lifting table, which may be a lifting table driven by an electric motor. In use, the lower support with the lower tool is moved relative to the upper support along the third axis.

Consequently, and after the first component has been arranged in the upper tool, the lifting table moves along the third axis into an intermediate position in which the preheating arrangement can be moved from the parking position into the preheating position between the components.

To this end, the preheating arrangement is arranged in the first position, in which the preheating structures arranged on the first and second side match the welding structures. In other words, in case the welding device is viewed along the third axis, i.e., the axis perpendicular to the first plane, the welding structures and the preheating structures are arranged one above the other, specifically completely. Thus, only one structure can be seen from this perspective when watching through the individual parts and components. The first plane may also be referred to as vibration welding plane in case of a vibration welding device.

As the preheating structures of the preheating arrangement must match the welding structures, the preheating structures must also be congruent to the welding structures and to each other, as explained above. Furthermore, and contrary to the welding structures of one component, the preheating structures of the preheating device must be oriented in the same manner, i.e., they may be arranged one above the other, particularly completely, when viewed from above and along the third axis, respectively, and through the preheating device. Thus, as discussed above, the term one above the other indicates that a shadow of one structure which is caused by an imaginary light shining from one side through the component covers the other structure completely. As the preheating structures are arranged completely one above the other, the second preheating structure must have the same orientation compared to the first preheating structure.

In this regard, the preheating device has a rectangular shape, and the first axis may extend parallel to the transverse sides of the rectangle whereas the second axis may extend parallel the longitudinal sides of the rectangle, as discussed above for the exemplary first component.

After the preheating arrangement has been arranged between the two components, the welding structures of the two components are preheated by means of the matching preheating structures. Thus, the preheating structures overlay the welding structures in the preheating position. In this regard, the first and the second preheating structure may be IR preheating structures.

Subsequently to the preheating, the preheating arrangement is moved from the preheating position back to the parking position. Thereafter, the lifting table is moved along the second axis into the welding position in which the first and the second component or the stack of welded components are in abutment and welded to each other, for example by means of vibration welding or IR welding. After the welding, the lower support is moved relative to the upper support back to its initial position.

As a result, a stack of welded components consisting of the first and the second component is now present in the lower tool. Contrary to the known methods, the stack of components is maintained in the lower tool. Thus, the side of the stack of welded components facing the upper tool corresponds to the side of the former first component which was arranged in the upper tool during the first cycle. This side having the second welding structure represents now the third welding structure of the stack of welded components.

In the following second cycle, a new first component is arranged in the upper tool. As the stack of welded components determines the welding structure, the new first component must be arranged in the upper tool such that second side having the second welding structure faces the lower tool or the stack of welded components arranged therein.

Now, the above-described process is repeated. As the orientation of the welding structures has changed from the first welding structure to the second welding structure, the former arrangement of the preheating device is not suitable and would not guarantee a reliable preheating of the welding structures in this cycle.

For overcoming this, the preheating arrangement is rotated, which may be in the parking position, from the first position to the second position. In this second position, the preheating device of the preheating arrangement has a second orientation in which the preheating structures are rotated around the axis of asymmetry by 180° compared to the first orientation or in which they are rotated by an angle α in the range of 0°<α<360°, or 90°≤α≤270 or α=180° around the third axis compared to the first orientation. In the present example, in which the welding structures and, thus, the preheating structures are rectangular with rounded corners and one protrusion in each of two adjacent corners, a rotation around the axis of asymmetry by 180° or a rotation around the third axis by 180° leads to the desired result. Nevertheless, the latter is only possible for specific designs of the welding structures and, thus, of the preheating structures, as will be explained later with respect to the specific embodiments.

After such rotating, the preheating structures match in the preheating position of the preheating arrangement the exposed welding structures, i.e., here the second welding structure and the corresponding third welding structure. Thus, the second cycle can be performed with a reliable preheating of the respective welding structures by means of the preheating arrangement.

After the preheating and the welding have been performed, as described above, the cycle may be repeated. This third cycle would correspond in general to the first cycle. Thus, the preheating arrangement must be rotated back into the first position.

In general, the cycle and, thus, the welding of a new first component to the stack of welded components is repeated until a stack of welded components is present having the desired number of layers or thickness.

A general positive effect of the preheating is that solid to solid friction, in case of friction or vibration welding of the components, is skipped at the beginning of the welding process. Thus, particulate formation is at least partially prevented, and a clean joint may be obtained. Furthermore, and again with respect to a vibration welding, the friction forces are reduced, and lower amplitudes may be used to create the weld between the components to be welded. These reduced forces are advantageous in case the components to be welded are structurally less stable and are prone to bending, which usually results in amplitude loss and a poor welding connection. Accordingly, and even in case the components are prone to bending, a reliable welding connection can be established by the preheating arrangement.

Additionally, and specifically due to designing the preheating arrangement such that it can be rotated, whereby the preheating structures match the welding structures to be preheated in each cycle, the method is simple, and the construction of the device is space-saving. Neither a further preheating arrangement is required for providing a preheating structure adapted to the welding structures to be preheated nor must the stack of welded components be removed and re-arranged in a different orientation in the lower tool. This reduces the complexity of the device as well as of the control method and the required installation space while maintaining at the same time a high weld quality.

For the sake of completeness, it is pointed out that the preheating device may also define a second plane perpendicular to the first plane. For example, and with respect to the above-mentioned rectangle, the welding device may have the shape of a cuboid wherein on opposite surfaces congruent preheating structures are arranged. Thus, the application field for the respective preheating device could be further increased. Assuming that the preheating structures are present with respect to the rotation axis on the surfaces being parallel thereto, a rotation by 180° must be performed for changing between the first and the second position, i.e. using the first and the second preheating structure, whereas a rotation by 90° must be performed to use the other preheating structures, i.e. the third and the fourth preheating structure. After a change of the preheating structure, the above describe steps are performed analogously.

In an embodiment of the preheating arrangement, the first actuator is used for rotating the preheating device around an axis in the first plane being parallel to the axis of asymmetry, around the axis of asymmetry or around the third axis. As explained above, the rotation around the third axis is only useful for specific designs of preheating structures and components to be welded. Thus, and advantageous is the embodiment, in which the first actuator may be used for rotating the preheating device around the axis of asymmetry or around an axis which is arranged in the first plane and is parallel to the axis of asymmetry. This is because after the rotation by 180° around such axis, regardless of whether it is the axis of asymmetry itself or an axis parallel thereto and in the first plane, leads to the same result.

A welding device for welding a first component to a second component or to a stack of welded components, comprises an upper tool mounted to an upper support for receiving the first component and a lower tool mounted to a lower support for receiving the second component or the stack of welded components as well as a preheating arrangement, wherein the preheating arrangement is movable between a parking position and a preheating position such that the preheating arrangement is arranged in the preheating position between the upper and the lower support, wherein in the preheating position the upper and the lower support are each arranged in a plane parallel to the first plane, and the upper and the lower support are movable relative to each other between an initial position and a welding position. The welding device has been discussed above during the explanation of the functioning of the preheating arrangement. Accordingly, it is referred to the above discussion for avoiding unnecessary repetitions. The same applies with respect to the resulting technical effects and advantages.

In a further embodiment of the welding device, the welding device is a vibration welding device or an infrared welding device. By means of this embodiment, the preheating device may be either used with a vibration welding device or in combination with an IR welding device. Consequently, the field of applications for the preheating arrangement is increased and adapted to the components to be welded.

A preheating method for preheating a first component and a second component or a stack of welded components by means of the preheating arrangement, wherein the first component comprises on a first side a first welding structure and on an opposite second side a second welding structure, the first and the second welding structure being formed congruent with the first and the second preheating structure of the preheating device and oriented such that the first welding structure and the second welding structure are rotated with respect to each other around the axis of asymmetry by 180° or around the third axis by the angle α, and the second component or the stack of welded components comprises at the side facing the first component a third welding structure which is oriented such that, when viewed along the third axis, the third welding structure is arranged above the welding structure of the first component facing the second component or facing the stack of welded components, wherein the preheating method comprises the steps of: moving the preheating arrangement from a parking position into a preheating position between the upper and the lower tool of a welding device, wherein the preheating device of the preheating arrangement is arranged in the first position having the first orientation in which the preheating structures overlay the welding structures in the preheating position, when viewed along the third axis, and an upper support as well as a lower support of the welding device are arranged in the preheating position each in a plane parallel to the first plane, preheating the first component and the second component or the stack of welded components, and moving the preheating arrangement from the preheating position into the parking position. This preheating method has been described already in combination with the preheating arrangement. Thus, and for avoiding redundancies, it is referred to the respective explanations with respect to the course of procedure, the technical effects as well as the advantages.

In an embodiment of the preheating method, it comprises after the step of preheating the further step: rotating the preheating arrangement, which may be in the parking position, by means of the at least one actuator from the first position into the second position. This makes it possible that in intermediate steps also components similar to the first component but having welding structures which are not rotated with respect to each other may be integrated into the stack of components. This further increases the application field for the preheating arrangement and, thus, the preheating method in case a stack of components shall be provided in which not every component is a first component but only, for example, every other component. Of course, any other pattern may be used, too. Regarding the rotating of the preheating arrangement, this can also take place during a movement from the parking position to the preheating position, during a movement from the preheating position to the parking position or at any time in the parking position, for example during a loading of a new first component to be welded into the welding device.

A welding method for welding a first component to a second component or to a stack of welded components by means of the welding device, wherein the first component comprises on a first side a first welding structure and on an opposite second side a second welding structure, the first and the second welding structure being formed congruent with the first and the second preheating structure of the preheating device and oriented such that the first welding structure and the second welding structure are rotated with respect to each other around the axis of asymmetry by 180° or around the third axis by the angle α, and the second component or the stack of welded components comprises at the side facing the first component a third welding structure which is oriented such that, when viewed along the third axis, the third welding structure is arranged above the welding structure of the first component facing the second component or facing the stack of welded components, wherein the welding method comprises the steps of: arranging the first component with the first side in the upper tool, moving the lower support having the lower tool with the second component or the stack of welded components arranged therein relative to the upper support into an intermediate position, performing the preheating method, wherein the preheating device is arranged in the first position, moving the lower support with the second component or with the stack of welded components relative to the upper support along the third axis to the welding position, welding the first component to the second component or to the stack of welded components so that an increased stack of welded components results, thereafter moving the lower support back to the initial position. Like the preheating method, the welding method has been described also above in combination with the preheating arrangement. Thus, it is referred to these statements with respect to the course of procedure, the technical effects as well as the advantages.

In an embodiment of the welding method, the step of arranging the first component in the upper tool comprises the steps of: arranging the first component in the lower tool, which may be on the second component or on the stack of welded components, and moving the lower support with the first component relative to the upper support along the third axis from the initial position to a transfer position. By means of these method steps, the user places the first component on the lower tool, which is then moved for transferring the first component to the upper tool. This eliminates the manual step of arranging the first component in the upper tool.

In a further embodiment of the welding method, it comprises after the step of moving the lower support back to the initial position the further steps of: arranging another first component in the upper tool such that the welding structure on the side facing the lower tool matches the third welding structure exposed by the stack of welded components in the lower tool and repeating the steps of moving the lower support to the intermediate position, performing the preheating method, moving the lower support into the welding position, welding the components to each other and moving the lower support to the initial position, wherein the preheating device has been rotated and is arranged in the second position. By means of this method step, it is ensured that in case a new first component shall be welded to the stack of welded components, the preheating arrangement is arranged such that the preheating structures match the orientation of the welding structures of the components to be welded to each other.

The welding method may comprise after the step of moving the lower support back to the initial position the further steps of: arranging a third component in the upper tool, wherein the third component comprises on the first side a fourth welding structure and on the opposite second side a fifth welding structure, wherein the fourth and the fifth welding structure correspond to the third welding structure and are oriented such that, when viewed along a third axis perpendicular to the first plane, the fourth and the fifth preheating structure are arranged one above the other, and wherein the third component is arranged in the upper tool such that the welding structure on the side facing the lower tool matches the third welding structure exposed by the stack of welded components in the lower tool, and repeating the steps of moving the lower support to the intermediate position, performing the preheating method, moving the lower support into the welding position, welding the components to each other and moving the lower support to the initial position, wherein the preheating device is maintained in the first or second position. This separate step allows that the third component may be welded to the stack of welded components. The third component corresponds to the first component in that it has the same welding structure. Nevertheless, it differs from the first component in that the respective welding structures are not rotated with respect to each other. In other words, they are arranged one above the other, like the design of the preheating structures of the preheating device. Consequently, and in combination with the former method step, the preheating device is not rotated every time it is placed in the parking position but only in case it is required. This makes the welding method more flexible and allows the production of a stack consisting of at least two different types of components. The first type being the above described first component, the second type being the third component.

In this regard, and with respect to each of the above mentioned further method steps, the arranging of the further first or of the third component may comprise the steps of arranging the first or third component in the lower tool, which may be on the second component or on the stack of welded components, and moving the lower support with the first or third component relative to the upper support along the third axis from the initial position to a transfer position.

A retrofitting method for a welding device, comprises the steps of: providing a preheating arrangement, incorporating the preheating arrangement into the welding device, and implementing the preheating arrangement in the control method of the welding device. By means of this method, an already existing welding device, for example a vibration welding device or an IR welding device, may be equipped with the preheating arrangement so that it realizes the above discussed technical effects and advantages.

BRIEF DESCRIPTION OF THE DRAWINGS

In the following, the present disclosure will be described in detail based on the drawings. In the drawings, the same reference signs denote the same elements and/or components. It shows.

DETAILED DESCRIPTION

Embodiments of the preheating arrangement are described in the following specifically with respect to the functioning thereof when it is used in a welding device. In general, the welding device and, thus, the preheating arrangement may be used in the automotive industry or in the medical technology. It may be used in any application in which a plurality of components shall be welded by means of e.g., vibration or IR welding to each other in a reliable manner.

Figures 1, 2:
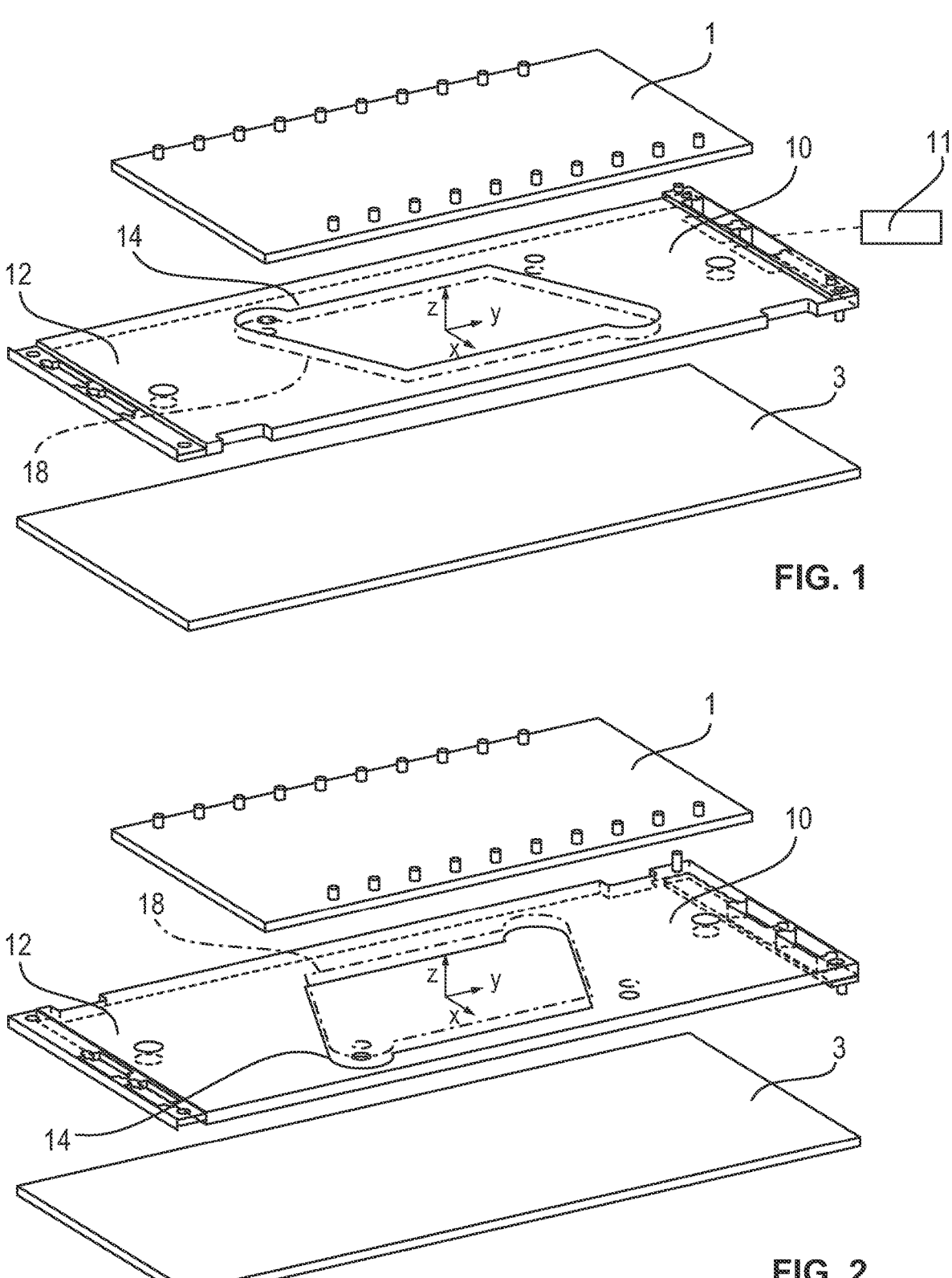
FIG. 1 shows an embodiment of a welding device having an embodiment of the preheating arrangement arranged in a first position.
FIG. 2 shows an embodiment of the welding device having the embodiment of the preheating arrangement arranged in a second position.
Figure 3:
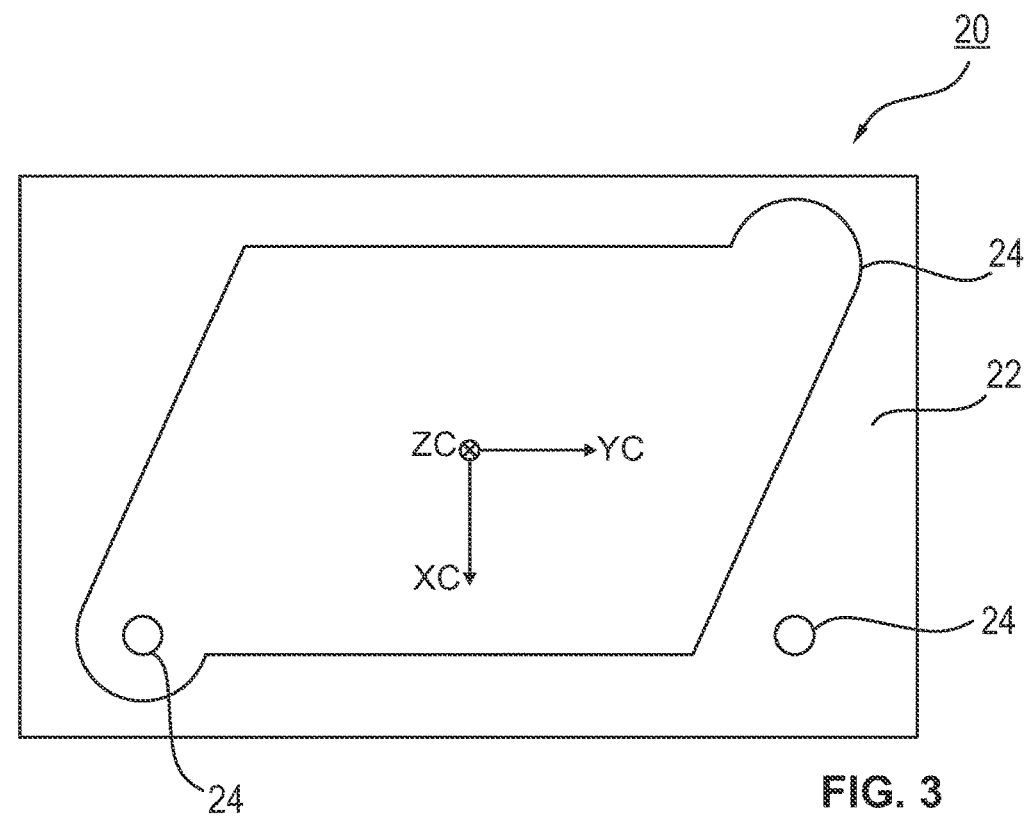
FIG. 3 shows a first side of a first component for illustrating the welding structure.
Figure 4:
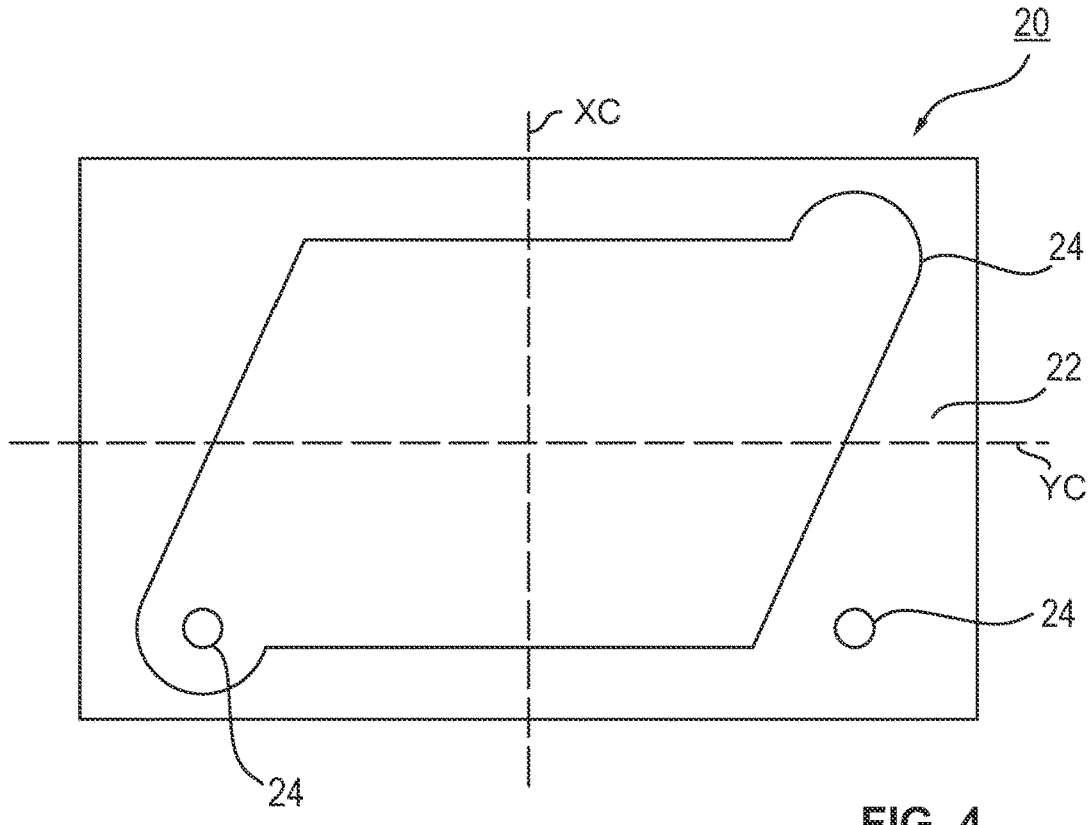
FIG. 4 shows the first side of the first component of FIG. 3 wherein the first and the second centerline is indicated.

First of all, and with respect to FIGS. 1 and 2, an embodiment of a vibration welding device comprising an embodiment of the preheating arrangement is explained.

The welding device comprises in a known manner an upper tool mounted to an upper support 1 for receiving a first component 20. Further, the welding device comprises a lower tool mounted to a lower support 3 for receiving the second component or the stack of welded components. The upper 1 and the lower support 3 are movable relative to each other between an initial position and a welding position. In the initial position, the components to be welded can be loaded into the welding device. In the welding position, the components in the welding device are in abutment so that they can be welded to each other. According to a first alternative, the welding device is a vibration welding device so that the components are welded to each other in the welding position by means of vibration welding. In a second alternative, the welding device is an infrared welding device so that the components are welded to each other in the welding position by means of IR welding.

During operation, the first component 20 is held in the upper tool by means of an underpressure. Furthermore, and for the exemplary operation, the upper support 1 of the welding device is an upper mounting plate and the lower support 3 is a lifting table, which may be a lifting table driven by an electric motor.

Further, the welding device comprises a preheating arrangement. The preheating arrangement is movable between a parking position and a preheating position. In the preheating position, the preheating arrangement is arranged between the upper 1 and the lower support 3. Accordingly, and with respect to FIGS. 1 and 2, the preheating arrangement is arranged in the preheating position.

Now, the specific design of the preheating arrangement is further explained. The preheating arrangement comprises a preheating device 10 having, in the shown example, a rectangular shape. This rectangular shape defines a first plane by means of a first centerline extending along a first axis X and a second centerline extending along a second axis Y being perpendicular to the first axis X.

In the embodiment shown, the first axis X and, thus, the first centerline extends parallel to and between the transverse sides of the rectangle whereas the second axis Y and, thus, the second centerline extends parallel to and between the longitudinal sides of the rectangle. The first and the second centerline define, as a result, the first plane and separate the preheating device 10 into four geometrically equal parts. The point of intersection of the centerlines indicates the geometric center of the preheating device, in which the shown coordinate system has its origin.

As can be directly seen, he upper 1 and the lower support 3 are each arranged in a plane parallel to the first plane in the preheating position.

The preheating device 10 has a first side 12 with a first preheating structure 14. This is shown in FIG. 1. The first preheating structure 14 is asymmetric with respect to the first centerline, i.e., the first axis X, and with respect to the second centerline, i.e., the second axis Y. Consequently, the first axis X and the second axis Y are each an axis of asymmetry. In other words, the image on one side of one of the centerlines or axes is not mirror-symmetrical with respect to the other side of the respective centerline or axis. Although this is an exemplary implementation, the remaining of the first or the second centerline may be an axis of symmetry, in case of a component having a rectangular shape.

In FIG. 2, the opposite second side 16 of the preheating device 10 is illustrated. The second side 16 has a second preheating structure 18. This second preheating structure 18 corresponds to the first preheating structure 14. It may be formed congruent with the first preheating structure 14. Congruent means in this regard that it has the same shape and size. Thus, the first 14 and the second preheating structure 18 are identical in terms of shape and size.

Furthermore, the second preheating structure 18 is oriented like the first preheating structure 14 such that, when viewed along a third axis Z perpendicular to the first plane, the first 14 and the second preheating structure 18 are arranged one above the other. The term one above the other indicates that a shadow of one structure which is caused by an imaginary light shining from one side through the preheating device 10 covers the other structure completely. Thus, and as the preheating structures 14, 18 are arranged one above the other, i.e., completely one above the other, the second preheating structure 18 must have the same orientation as the first preheating structure 14. This is also based on the fact that later, during use of the welding device, two components shall be welded to each other having matching welding structures, as will be explained below.

Further, and again with respect to the preheating arrangement, it should be noted when comparing FIGS. 1 and 2, that the position of the preheating device 10 has changed from a first position in FIG. 1 to a second position in FIG. 2. This can be seen, for example, due to the two recesses in the longitudinal side of the preheating device 5. For performing this change in the position, the preheating arrangement comprises a first rotating actuator (or first actuator) 11 (shown in FIG. 1) coupled to the preheating device to rotate the preheating device 10 between the first position and the second position. The first actuator 11 may be a linear, reciprocating or rotary actuator and may include, by way of non-limiting examples, an electromotive or pneumatic actuator. In at least some implementations, the first actuator 11 acts directly on the preheating device to cause a direct rotational movement of the preheating device without a mechanical linkage or mechanical redirecting between the actuator 11 and preheating device. Of course, other arrangements may be used, as would be understood by a person of ordinary skill in the art in view of the entire disclosure herein.

Based on the desired later operation, the first and the second position differ from each other in that the preheating structures 14, 18 in the first position have a first orientation and in the second position a second orientation in which they are rotated in a first alternative around the axis of asymmetry by 180° compared to the first orientation. This alternative is shown in FIGS. 1 and 2 as the welding device 10 has been rotated around the second centerline, i.e., the Y-axis as axis of asymmetry.

According to an alternative, and in case the preheating structure is mirror-symmetrical with respect to one of the first and the second centerline, it may also be preferred to rotate the preheating structures 14, 18 by an angle α in the range of 0°<α<360°, or 90°≤α≤270° or α=180° around the third axis Z compared to the first orientation. If, in such a case, the preheating device 10 is rotated by 180° around the third axis Z, the result would be identical to a rotation around the axis of asymmetry.

Based on the above, the first rotating actuator 11 is used for rotating the preheating device 10 around an axis in the first plane being parallel to the axis of asymmetry, i.e., here the second axis Y, or around the axis of asymmetry for realizing the embodiment shown. For realizing other alternatives, the first actuator 11 may be used for rotating the preheating device 10 around the third axis Z. Nevertheless, the rotation around the third axis Z is only useful for specific designs of preheating structures 14, 18 and components 20 to be welded.

In addition to the first actuator 11, the preheating arrangement can be equipped with further rotating actuators, for example a second actuator for rotating around the third axis Z. Alternatively, the preheating arrangement may be provided with one rotating actuator per axis, which would result in three rotating actuators. Thus, the preheating arrangement is adapted to various preheating devices and preheating structures.

For the sake of completeness, it is pointed out that the upper 1 and the lower support 3 are each arranged in a plane parallel to the first plane defined by the preheating device 5 when the preheating arrangement is in the preheating position. The term third axis Z refers, thus, to the axis being perpendicular to the respective plane.

By means of the welding device, a plurality of components is welded to each other. An exemplary first component 20 is described with respect to FIGS. 3 to 8.

The first component 20 has a rectangular shape, like the preheating device 5. Accordingly, a first centerline of the component, i.e., the axis XC (see FIG. 3), extends parallel to and between the transverse sides of the component and a second centerline, i.e., the axis YC (see FIG. 3), extends parallel to and between the longitudinal sides of the first component 20. The first and the second centerline define, as a result, a plane and separate the component into four geometrically equal parts. The point of intersection of the centerlines indicates the geometric center of the component, in which the point of origin for the coordinate system is shown. The third axis ZC extends perpendicular to the plane.

On a first side 22 of the first component 20, a first welding structure 24 is arranged. The first welding structure 24 is formed congruent with the first 14 and the second 18 preheating structure of the preheating device 10. As explained above, congruent means in this regard that it has the same shape and size. Thus, the first 14 and the second preheating structure 18 as well as the first welding structure 24 are identical in terms of shape and size. As a result, the first centerline, i.e., the first axis XC, and the second centerline, i.e., the second axis YC, are axes of asymmetry. In other words, the image on one side of one of the centerlines or axes is not mirror-symmetrical with respect to the other side of the respective centerline or axis.

On the second side of the first component 20, a second welding structure 28 is arranged. This second welding structure 28 can be seen in FIGS. 6 to 8. These figures illustrate a view through the component so that the first welding structure 24 as well as the second welding structure 28 can be seen at the same time, although they are arranged on opposite sides.

The second welding structure 28 is congruent with the first welding structure 24 and, thus, also congruent with the first 14 and second preheating structure 18. Accordingly, these structures 14, 18, 24, 28 have the same size and shape.

Figures 5, 6:
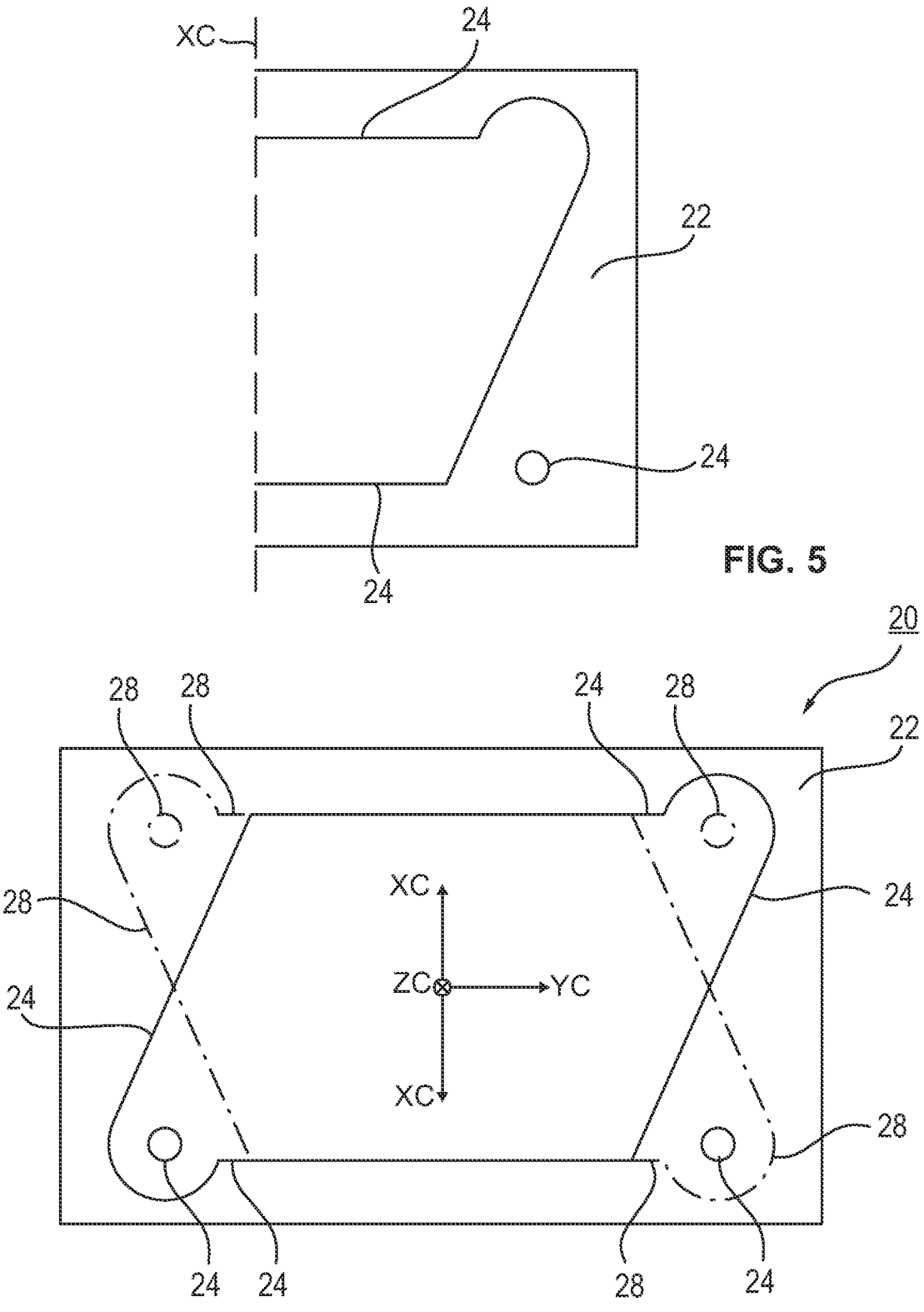
FIG. 5 shows an enlarged view of the right side of the first component of FIG. 4.
FIG. 6 shows the first component of FIG. 3 in which additionally a second welding structure on the opposite second side is illustrated.
Figures 7, 8:
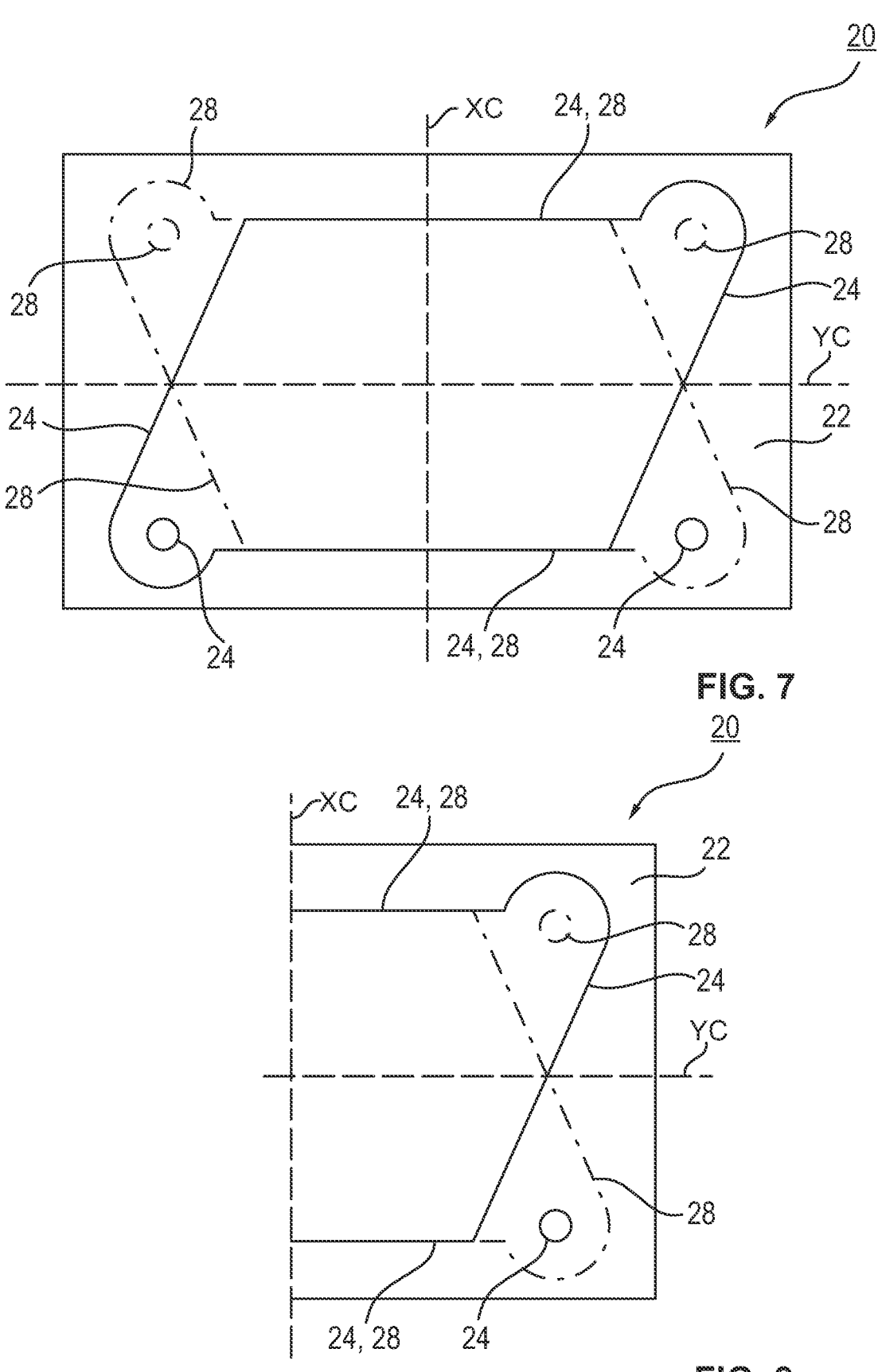
FIG. 7 shows the first component of FIG. 6 wherein the first and the second centerline is indicated.
FIG. 8 shows an enlarged view of the right side of the first component of FIG. 7.

However, and as can be seen from FIGS. 6 to 8, the second welding structure 28 is arranged in a different orientation on the second side compared to the first welding structure 24 on the first side 22. This different orientation is achieved in that the second welding structure 28 is arranged on the second side in a rotated manner compared to the first welding structure 24. In the embodiment shown, a rotation of the second welding structure 28 on the second side around the second axis YC by 180° results in the first welding structure 24. Thus, the first 24 and he second welding structure 28 are rotation-symmetric with respect to each other.

Turning back to FIGS. 6 to 8 and the view shown there, the first 24 and the second welding structures 28 overlay each other not completely, i.e., they are not arranged completely one above the other, when viewed from above the first side 22 and through the first component 20. The same applies in case the first component 20 is viewed from the second side.

The rotation for achieving such different orientation is performed by rotating the second welding structure 28 compared to the first welding structure 24 around the second axis YC as axis of asymmetry by 180°.

Due to this, and in case the first component 10 is turned from a position in which the first side 22 can be seen around the second axis YC as axis of asymmetry to a position in which the second side can be seen, the second welding structure 28 will expose the same orientation to the observer as the first welding structure 24. On the other hand, and in case the first component 20 is turned from the first side 22 to the second side around the first axis XC as axis of asymmetry, the second welding structure 28 will expose a different orientation compared to the first welding structure 24.

According to an alternative, and in case the welding structure is mirror-symmetrical with respect to one of the first XC and the second axis YC, the second welding structure 28 could be rotated compared to the first welding structure 24 around the third axis ZC, which may be perpendicular to the plane, by a certain degree α. For example, the rotation around the third axis ZC could be 180°. Thus, a rotation by 180°, regardless of other possible rotation angles, may be preferred. Nevertheless, and in case the welding structures 24, 28 may be asymmetrical with respect to both centerlines, a rotation by other angle values unequal to 0° and 360° may be useful.

That said with respect to the general design of the first component 20 and, thus, of the components to be welded to each other, the welding method and the preheating method will be explained with respect to several exemplary welding cycles.

Initially, the first component 20 is arranged in the upper tool and a second component, being either identical to the first component 20 or having at least on one side a third welding structure congruent with and matching one of the first 24 or the second welding structure 28 of the first component 20, is arranged in the lower tool. As an alternative, a stack of welded components is already present in the lower tool. In each case, the first component 20 and the second component or the first component 20 and the stack of welded components are arranged such that their welding structures match each other.

For an easier understanding, it is assumed that the first component 20 is arranged in the upper tool such that the first side 22 having the first welding structure 24 faces the lower tool and the second side having the second welding structure 28 is arranged in the upper tool. Consequently, the second component, which is in this example identical to the first component 20, is arranged in the lower tool such that the first side 22 having the first welding structure 24 faces the upper tool, i.e., the first side 22 of the first component 20 in the upper tool. Later, the welding structure exposed by the second component or stack of welded components being present in the lower tool is referred to as third welding structure.

After the first component 20 has been arranged in the upper tool, the lifting table moves along the third axis Z into an intermediate position in which the preheating arrangement can be moved from the parking position into the preheating position between the components 20.

To this end, the preheating arrangement is arranged in the first position as shown in FIG. 1, in which the preheating structures arranged on the first 12 and second side 16 match the welding structures 24 of the first component 20 in the upper and lower tool. In other words, in case the welding device is viewed along the third axis Z, the welding structures 24 and the preheating structures 14, 18 are arranged one above the other, specifically completely. Thus, only one structure can be seen from this perspective when watching through the individual parts and components. The first plane may also be referred to as vibration welding plane in case of a vibration welding device.

As the preheating structures 14, 18 of the preheating arrangement must match the welding structures 24, the preheating structures 14, 18 of the preheating device 10 must be oriented in the same manner, as discussed above. Thus, they may be arranged one above the other, particularly completely, when viewed from above and along the third axis Z, respectively, and through the preheating device 10.

After the preheating arrangement has been arranged between the two components 20, the welding structures 24 of the two components 20 are preheated by means of the matching preheating structures 14, 18. Thus, the preheating structures 14, 18 overlay the welding structures 24 in the preheating position. In this regard, the first 14 and the second preheating structure 18 may be IR preheating structures.

Subsequently to the preheating, the preheating arrangement is moved from the preheating position back to the parking position. Thereafter, the lifting table, i.e., the lower support 5, is moved along the third axis Z into the welding position in which the first and the second component 20 or the stack of welded components are in abutment and welded to each other, for example by means of vibration welding or IR welding. After the welding, the lower support 3 is moved relative to the upper support 1 back to its initial position.

As a result, a stack of welded components consisting of the first and the second component 20 or an increased stack of welded components 20 is now present in the lower tool. Contrary to the known methods, the stack of components is maintained in the lower tool. Thus, the side of the stack of welded components facing the upper tool or upper support 1 corresponds to the side of the former first component 20 which was arranged in the upper tool during the first cycle. This side, which has the second welding structure 28, represents now the third welding structure of the stack of welded components.

In the following second cycle, another first component 20 is arranged in the upper tool. As the stack of welded components determines the welding structure and, the orientation thereof, the new first component 20 may be arranged in the upper tool such that second side having the second welding structure 28 faces the lower tool, i.e., the stack of welded components arranged therein.

Now, the above-described process is repeated. However, and as the orientation of the welding structures has changed from the first welding structure 24 to the second welding structure 28, the former position of the preheating device 10 is not suitable and would not guarantee a reliable preheating of the welding structures 28 in this cycle.

For overcoming this, the preheating arrangement is rotated, which may be in the parking position, from the first position to the second position, as shown in FIG. 2 and explained above. After such rotating, the preheating structures 14, 18 match in the preheating position of the preheating arrangement again the exposed welding structures, i.e., here the second welding structure 28 and the corresponding third welding structure. Thus, the second cycle can be performed with a reliable preheating of the respective welding structures 28 by means of the preheating arrangement.

After the preheating and the welding have been performed, as described above, the cycle may be repeated. This third cycle would correspond in general to the first cycle. Thus, the preheating arrangement must be rotated back into the first position.

In general, the cycle and, thus, the welding of another first component 20 to the stack of welded components is repeated until a stack of welded components is present having the desired number of layers or thickness.

A general positive effect of the preheating is that solid to solid friction, in case of friction or vibration welding of the components, is skipped at the beginning of the welding process. Thus, particulate formation is at least partially prevented, and a clean joint may be obtained. Furthermore, and again with respect to a vibration welding, the friction forces are reduced, and lower amplitudes may be used to create the weld between the components to be welded. These reduced forces are advantageous in case the components to be welded are structurally less stable and are prone to bending, which usually results in amplitude loss and a poor welding connection. Accordingly, and even in case the components are prone to bending, a reliable welding connection can be established by means of the preheating arrangement.

Additionally, and specifically due to designing the preheating arrangement, the preheating device 10, such that it may be rotated, whereby the preheating structures 14, 18 match the welding structures 24, 28 to be preheated in each cycle, the method is simple, and the construction of the device is space-saving. Neither a further preheating arrangement is required for providing a preheating structure adapted to the welding structures to be preheated nor must the stack of welded components be removed and re-arranged in a different orientation in the lower tool. This reduces the complexity of the device as well as of the control method and the required installation space while maintaining at the same time a high weld quality.

Figure 9:
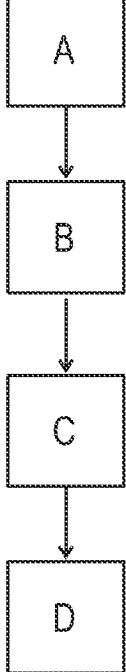
FIG. 9 shows a flow chart of an embodiment of the preheating method.

An embodiment of the preheating method for preheating the first component 20 and a second component or a stack of welded components by means of the preheating arrangement is explained for further clarification with respect to FIG. 9.

As discussed above, the first component 20 comprises on a first side 22 a first welding structure 24 and on an opposite second side a second welding structure 28. The first 24 and the second welding structures 28 are formed congruent with the first 14 and the second preheating structure 18 of the preheating device 10 and oriented such that the first welding structure 24 and the second welding structure 28 are rotated with respect to each other around the axis of asymmetry by 180° or around the third axis by the angle α. The second component or the stack of welded components comprises at the side facing the first component 20 a third welding structure which is oriented such that, when viewed along the third axis Z, the third welding structure is arranged above the welding structure 24, 28 of the first component 20 facing the second component or facing the stack of welded components.

In a first step A, the preheating arrangement is moved from a parking position into a preheating position between the upper and the lower tool of a welding device. The preheating device of the preheating arrangement is arranged in the first position having the first orientation in which the preheating structures 14, 18 overlay the welding structures 24 or 28 in the preheating position, when viewed along the third axis Z. The upper support 1 as well as the lower support 3 of the welding device are arranged in the preheating position each in a plane parallel to the first plane.

Next, the first component 20 and the second component or the stack of welded components are preheated in step B.

In step C, the preheating arrangement is moved from the preheating position into the parking position.

In the parking position, the further step D of rotating the preheating arrangement by means of the at least one first actuator from the first position into the second position may be performed. This rotation takes place according to one alternative during or after the preheating arrangement has been moved from the preheating position to the parking position. In this regard, the rotating may be performed at any time in the parking position, for example during a loading of a new first component to be welded into the welding device. According to another alternative, this step is performed during or before the preheating arrangement is moved from the parking position to the preheating position.

In general, this additional step makes it possible that in intermediate steps also a third component, which is similar to the first component but has welding structures which are not rotated with respect to each other may be integrated into the stack of components. In this regard it is referred to the below description of the welding method comprising the welding of the third component. This further increases the application field for the preheating arrangement and, thus, the preheating method in case a stack of components shall be provided in which not every component is a first component 20 but only, for example, every other component. Of course, any other pattern may be used, too.

Figure 10:
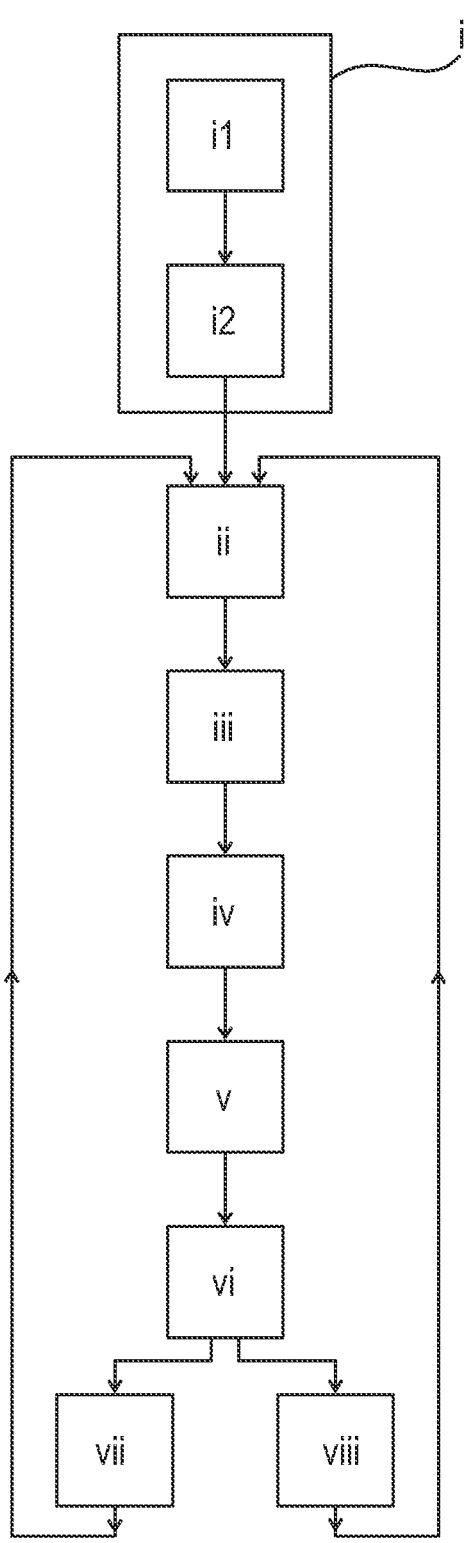
FIG. 10 shows a flow chart of an embodiment of the welding method.

Now, and with respect to FIG. 10, a welding method for welding a first component 20 to a second component or to a stack of welded components by means of the welding device is explained.

Again, the first component 20 comprises on a first side 22 a first welding structure 24 and on an opposite second side a second welding structure 28. The first 24 and the second welding structure 28 are formed congruent with the first 14 and the second preheating structure 18 of the preheating device 10. Further, the first 24 and the second welding structures 28 are oriented such that the first welding structure 24 and the second welding structure 28 are rotated with respect to each other around the axis of asymmetry by 180° or around the third axis Z by the angle α. The second component or the stack of welded components comprises at the side facing the first component 20 a third welding structure which is oriented such that, when viewed along the third axis Z, the third welding structure is arranged above the welding structure 24, 28 of the first component 20 facing the second component or facing the stack of welded components.

In a first step i, the first component 20 is arranged with the first side in the upper tool. This step i comprises in the described embodiment the further steps i1 of arranging the first component 20 in the lower tool, which may be on the second component or on the stack of welded components, and i2 of moving the lower support 3 with the first component 20 relative to the upper support 1 along the third axis Z from the initial position to a transfer position. By means of these method steps, the user places the first component 20 on the lower tool, which is then moved for transferring the first component 20 to the upper tool. This eliminates the manual step of arranging the first component in the upper tool.

Subsequently to the first step i, a moving of the lower support 3 having the lower tool with the second component or the stack of welded components arranged therein relative to the upper support 1 into an intermediate position takes place in step ii.

In this intermediate position, the above-described embodiment of the preheating method is performed in step iii. To this end, the preheating device 10 is arranged in the first position.

Thereafter, the lower support 3 with the second component or with the stack of welded components is moved in step iv relative to the upper support 1 along the third axis Z to the welding position. A welding of the first component 20 to the second component or to the stack of welded components takes place in step v so that an increased stack of welded components results. This increase of the stack is considered in every subsequent cycle when approaching the welding position. Thereafter, the lower support 3 is moved back to the initial position in step vi.

In a first alternative, the welding method comprises now the step vii of arranging another first component 20 in the upper tool. This is performed such that the welding structure on the side facing the lower tool matches the third welding structure exposed by the stack of welded components in the lower tool. Subsequently, above steps ii to vi of moving the lower support 3 to the intermediate position, performing the preheating method, moving the lower support 3 into the welding position, welding the components to each other and moving the lower support 3 to the initial position are repeated. However, it should be considered that the preheating device 10 has been rotated prior to the preheating in this cycle and is, thus, arranged in the second position. By means of this alternative, it is ensured that in case another or new first component 20 is welded to the stack of welded components, the preheating arrangement is arranged such that the preheating structures 14, 18 match the orientation of the welding structures 24, 28 of the components to be welded to each other.

In a second alternative, the welding method comprises after the step vi of moving the lower support 3 back to the initial position the step viii of arranging a third component (not shown) in the upper tool. The third component comprises on the first side a fourth welding structure and on the opposite second side a fifth welding structure. The fourth and the fifth welding structure correspond to the third welding structure and are oriented such that, when viewed along the third axis perpendicular to the first plane, the fourth and the fifth preheating structure are arranged one above the other.

Again, and like for the further first component, the third component is arranged in the upper tool such that the welding structure on the side facing the lower tool matches the third welding structure exposed by the stack of welded components in the lower tool. Thereafter, the steps ii to vi of moving the lower support 3 to the intermediate position, performing the preheating method, moving the lower support 3 into the welding position, welding the components to each other and moving the lower support 3 to the initial position are repeated. Here, it should be considered that the preheating device is maintained in the first or second position.

This separate step, thus, allows that the third component may be welded to the stack of welded components. The third component corresponds to the first component in that it has the same welding structure. Nevertheless, it differs from the first component in that the respective welding structures are not rotated with respect to each other. In other words, they are arranged one above the other, like the orientation of the preheating structures 14, 18 of the preheating device 10.

Consequently, and in combination with the first alternative, the preheating device 10 is not rotated every time it is placed in the parking position but only in case it is required. This makes the welding method more flexible and allows the production of a stack consisting of at least two different types of components. The first type being the above described first component, the second type being the third component.

Figure 11:
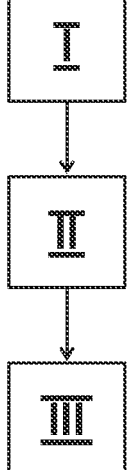
FIG. 11 shows a flow chart of an embodiment of the retrofitting method.

Finally, and with respect to FIG. 11, a retrofitting method for a welding device is discussed. The method comprises initially the step I of providing a preheating arrangement. Subsequently, the preheating arrangement is incorporated in step II into the welding device. Finally, and in step III, the preheating arrangement is implemented into the control method of the welding device. Thus, and by means of this method, an already existing welding device, for example a vibration welding device or an IR welding device, is equipped with the preheating arrangement so that it realizes the above discussed technical effects and advantages.

The invention claimed is:

1. A preheating arrangement for a welding device having an upper tool mounted to an upper support and a lower tool mounted to a lower support, wherein the upper and the lower support are movable relative to each other between an initial position and a welding position, and the preheating arrangement comprises:
   a. a preheating device defining a first plane by a first centerline extending along a first axis X and a second centerline extending along a second axis Y being perpendicular to the first axis X, and
   b. the preheating device has a first side with a first preheating structure and an opposite second side with a second preheating structure, wherein
   c. the first preheating structure is asymmetric with respect to the first and/or the second centerline so that a respective axis is an axis of asymmetry, and
   d. the second preheating structure is oriented like the first preheating structure such that, when viewed along a third axis Z perpendicular to the first plane, the first and the second preheating structure are arranged one above the other, wherein
   e. the preheating arrangement comprises further a first actuator arranged to rotate the preheating device between a first position and a second position such that the preheating structures in the first position have a first orientation and in the second position a second orientation
      e1. in which the preheating structures are rotated around the axis of asymmetry by 180° compared to the first orientation or
      e2. in which the preheating structures are rotated by an angle $\alpha$ in the range of $0°<\alpha<360°$ around the third axis Z compared to the first orientation.

2. The preheating arrangement according to claim 1, wherein the first or the second centerline is an axis of symmetry.

3. The preheating arrangement according to claim 1, wherein the first actuator is used to rotate the preheating device a. around an axis in the first plane being parallel to the axis of asymmetry, b. around the axis of asymmetry, or c. around the third axis Z.

4. The preheating arrangement according to claim 1, wherein the preheating device has a rectangular shape and the first axis X extends parallel to transverse sides of the rectangle whereas the second axis Y extends parallel to longitudinal sides of the rectangle.

5. The preheating arrangement according to claim 1, wherein the first and the second preheating structure is an IR preheating structure.

6. The preheating arrangement according to claim 1 wherein the second preheating structure is identical to the first preheating structure.

7. A welding device for welding a first component to a second component or to a stack of welded components, comprising a. the upper tool mounted to the upper support for receiving the first component and b. the lower tool mounted to the lower support for receiving the second component or the stack of welded components, as well as c. a preheating arrangement according to claim 1, wherein d. the preheating arrangement is movable between a parking position and a preheating position such that the preheating arrangement is arranged in the preheating position between the upper and the lower support, wherein in the preheating position the upper and the lower support are each arranged in a plane parallel to the first plane, and e. the upper and the lower support are movable relative to each other between an initial position and a welding position.

8. The welding device according to claim 7, wherein the welding device is a vibration welding device or an infrared welding device.

* * * * *